US012561653B2

(12) United States Patent
Gulati et al.

(10) Patent No.: US 12,561,653 B2
(45) Date of Patent: Feb. 24, 2026

(54) DIGITAL SOCIAL NETWORKING FRAMEWORK WITH ANALYTICS DASHBOARD

(71) Applicant: Meta Platforms, Inc., Menlo Park, CA (US)

(72) Inventors: Shabnum Gulati, New York, NY (US); Oluwakayode M Ajimatanrareje, Jr., Fremont, CA (US); Jordan Springstroh, Austin, TX (US); Trevor Nesbitt, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 3 days.

(21) Appl. No.: 18/310,118

(22) Filed: May 1, 2023

(65) Prior Publication Data

US 2024/0370943 A1 Nov. 7, 2024

(51) Int. Cl.
G06F 3/04842 (2022.01)
G06F 16/9535 (2019.01)
G06Q 50/00 (2024.01)

(52) U.S. Cl.
CPC ......... G06Q 50/01 (2013.01); G06F 3/04842 (2013.01); G06F 16/9535 (2019.01)

(58) Field of Classification Search
CPC .. G06Q 50/01; G06F 3/04842; G06F 16/9535
See application file for complete search history.

(56) References Cited

U.S. PATENT DOCUMENTS

| | | | | |
|---|---|---|---|---|
| 8,694,531 B1 * | 4/2014 | Stearns | ................ | G06F 16/635 707/767 |
| 2004/0260781 A1 * | 12/2004 | Shostack | ................ | G06Q 30/02 709/207 |
| 2007/0031800 A1 * | 2/2007 | Solomon | ................ | G06Q 30/02 434/362 |
| 2009/0075738 A1 * | 3/2009 | Pearce | ................ | G07F 17/3237 709/218 |
| 2009/0271212 A1 * | 10/2009 | Savjani | ............. | G06Q 30/0207 705/14.1 |
| 2011/0252340 A1 * | 10/2011 | Thomas | ................ | G06Q 50/01 715/756 |
| 2016/0004778 A1 * | 1/2016 | Finder | .................... | H04L 12/18 707/722 |
| 2016/0162488 A1 * | 6/2016 | Corradi | ............. | G06Q 10/1053 707/734 |
| 2016/0246790 A1 * | 8/2016 | Cowdrey | ............ | G06F 16/9535 |
| 2018/0047070 A1 * | 2/2018 | Koenig | ............. | G06Q 30/0282 |
| 2018/0096074 A1 * | 4/2018 | Gueye | ................ | G06Q 30/0252 |
| 2018/0130139 A1 * | 5/2018 | Hurley | .................. | G06Q 50/01 |
| 2019/0065609 A1 * | 2/2019 | Finder | .................... | G06Q 10/10 |

(Continued)

*Primary Examiner* — Ariel Mercado-Vargas
(74) *Attorney, Agent, or Firm* — EVERSHEDS SUTHERLAND (US) LLP

(57) ABSTRACT

The disclosed systems and methods may include (1) providing a selectable dashboard element within an interface of a dating application configured for a user of the dating application, (2) receiving user input selecting the dashboard element, and (3) in response to receiving the user input, presenting a digital dating-analytics dashboard that provides information relating to the user's dating history aggregated via the dating application. Various other methods, systems, and computer-readable media are also disclosed.

20 Claims, 12 Drawing Sheets

(56)                    References Cited

U.S. PATENT DOCUMENTS

| | | | |
|---|---|---|---|
| 2019/0236722 A1* | 8/2019 | Bhat | G06Q 20/386 |
| 2020/0125647 A1* | 4/2020 | Mintz | G06V 40/174 |
| 2020/0234336 A1* | 7/2020 | Dworkin | G06Q 30/0224 |
| 2021/0158457 A1* | 5/2021 | Springstroh | H04L 51/52 |
| 2021/0209700 A1* | 7/2021 | Lubash | H04L 67/14 |
| 2022/0327643 A1* | 10/2022 | Law | G06Q 30/0631 |
| 2022/0337639 A1* | 10/2022 | Emile | G06F 3/0484 |

* cited by examiner

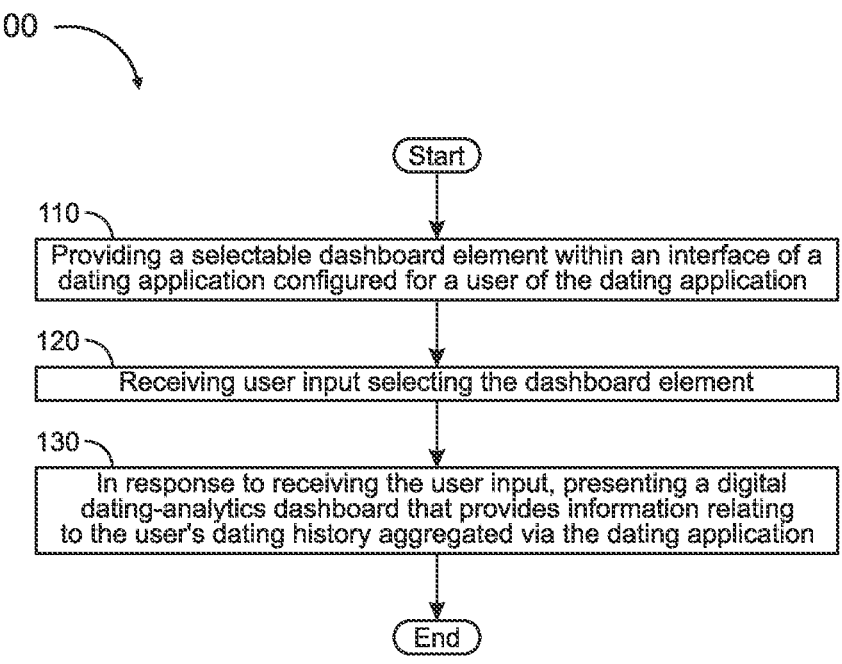

100

Start

110
Providing a selectable dashboard element within an interface of a dating application configured for a user of the dating application 120
Receiving user input selecting the dashboard element 130
In response to receiving the user input, presenting a digital dating-analytics dashboard that provides information relating to the user's dating history aggregated via the dating application End

FIG. 1

DIGITAL SOCIAL NETWORKING FRAMEWORK WITH ANALYTICS DASHBOARD

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 is a flow diagram of an exemplary method relating to a digital social networking framework.

Figure 2:
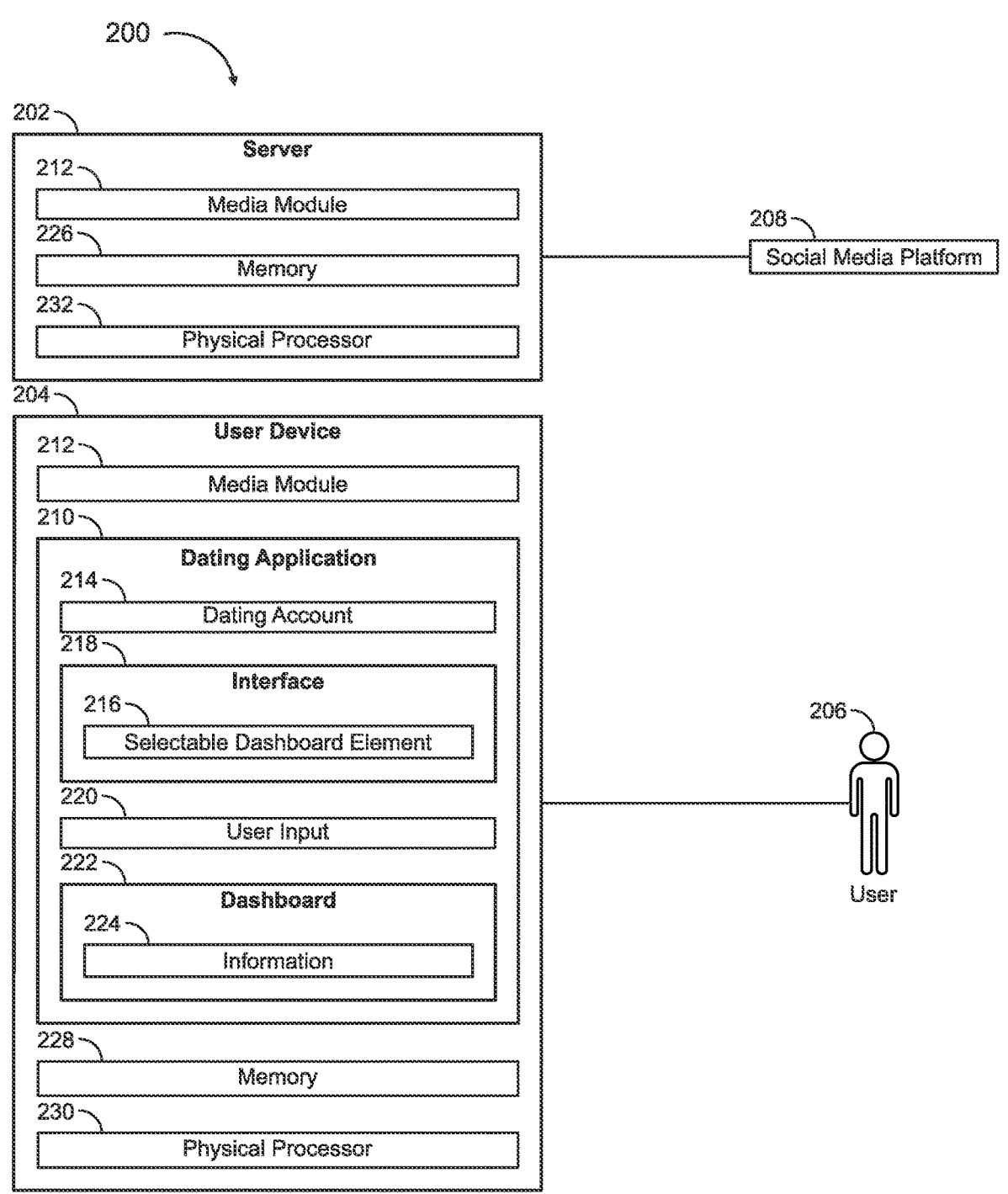
FIG. 2 is a block diagram of an exemplary system for a digital social networking framework.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a digital social media framework that includes a dating service. In some examples, the dating service may generate, for a user with a dating account (i.e., a "dater"), a digital dating-analytics dashboard (e.g., a digital dating-insights board) summarizing various aspects of the dater's dating experience with the dating application. In some examples, the dating-analytics dashboard may include a common interests section that shows interests of the dater that overlap with interests of the dater's dating matches (e.g., 80% of accepted matches have cats as a common interest, 20% have surfacing as a common interest, etc.). Other information included within the dating-analytics dashboard may include a location summary (e.g., top locations of accepted matches) and/or a facts summary (e.g., a number of messages sent to or received by dating matches in the past month). In some examples, the dating-analytics dashboard may include some digital tips for an improved dating experience and/or short-form videos (e.g., from dating experts and/or with content detected to be related to a finding presented within the insights board). In some examples, a shareable short-form video may automatically be generated based on the analytics presented within the dating-analytics dashboard, which the dater may be enabled to select to share to a social media platform.

In certain examples, the disclosed digital social media framework may enable a dater to create a shareable dating profile. This profile may represent a shareable version of the dater's full dating profile that may, when shared to a social media platform, have permission to be reshared. In some examples, the shareable version of the dater's dating profile may represent a social media composition that includes (1) content from the dater's full dating profile (e.g., one or more photos and/or a list of interests) and (2) a link to the dater's full dating profile (e.g., accessible via a dating application associated with the dating profile).

As will be explained in greater detail below, embodiments of the present disclosure may improve the field of social networking by improving data culling, data organization, data access, and data discovery. Embodiments of the present disclosure may improve a computer itself by improving data consumption flows and data organization.

The following will provide, with reference to FIG. 1, detailed descriptions of computer-implemented methods relating to a social media framework. Detailed descriptions of corresponding example systems will also be provided in connection with FIG. 2. Detailed descriptions of interfaces and embodiments corresponding to the disclosed methods and systems will be provided in connection with FIGS. 3-14.

FIG. 1 is a flow diagram of an exemplary computer-implemented method 100 relating to a social media framework. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device such as a user device 204 associated with a user 206. In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a social networking platform via an interface of the social networking platform. Examples of social networking may include, without limitation, li text-based and/or image-based communication, video-based communication, audio-based communication, videoconferencing and/or audioconferencing, digital status broadcasting, private digital messaging, public content posting and/or commenting via a social media feed and/or a profile, etc. In some examples, server 202 may operate as part of and/or in connection with a social media platform 208. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, user 206 of user device 204 may be a user (e.g., a member) of a social networking platform (e.g., social media platform 208). In these examples, user device 204 may have installed an instance of a social media application (e.g., a dating application 210), which may operate as part of social media platform 208 and through which one or more services provided by social media platform 208 (e.g., via server 202) may be accessible. In some examples, the social media application may be dedicated to a single service. For example, the social media application may represent a dedicated dating application. In other examples, the social media application may provide access to multiple services (e.g., a combination of two or more of the social networking services described below). In addition, or as an alternative, to a social media application, user device 204 may have installed a browser that may navigate to one or more webpages through which the one or more services provided by social media platform 208 (e.g., via server 202) may also be accessible.

In some examples, the steps shown in FIG. 1 may be performed (at least in part) by modules operating in an additional user device. In these examples, the additional user device may include any of the features described above in connection with user device 204 and may have installed an additional instance of the social media application described above, which may operate as part of social media platform 208 and through which one or more services provided by social media platform 208 (e.g., via server 202) may be accessible.

As mentioned above, social media platform 208 may provide a variety of services (e.g., platforms and/or frameworks) for the users within its network (e.g., via server 202 and/or a social media application). In some examples, social media platform 208 may provide a newsfeed service. The term "newsfeed" may generally refer to any type or form of social media consumption channel, provided via an interface, that presents a scrollable collection of newsfeed posts. In some examples, a newsfeed may scroll (e.g., upward or downward) to reveal the different posts within the newsfeed (e.g., in response to receiving user scrolling input). In one example, the scrollable collection may include newsfeed posts created by contacts of a particular user (e.g., friends of the particular user) and/or other users that the particular user is following (i.e., connected content). Additionally, the newsfeed may include non-connected content (e.g., content created by users who are not contacts of the particular user).

Figure 3:
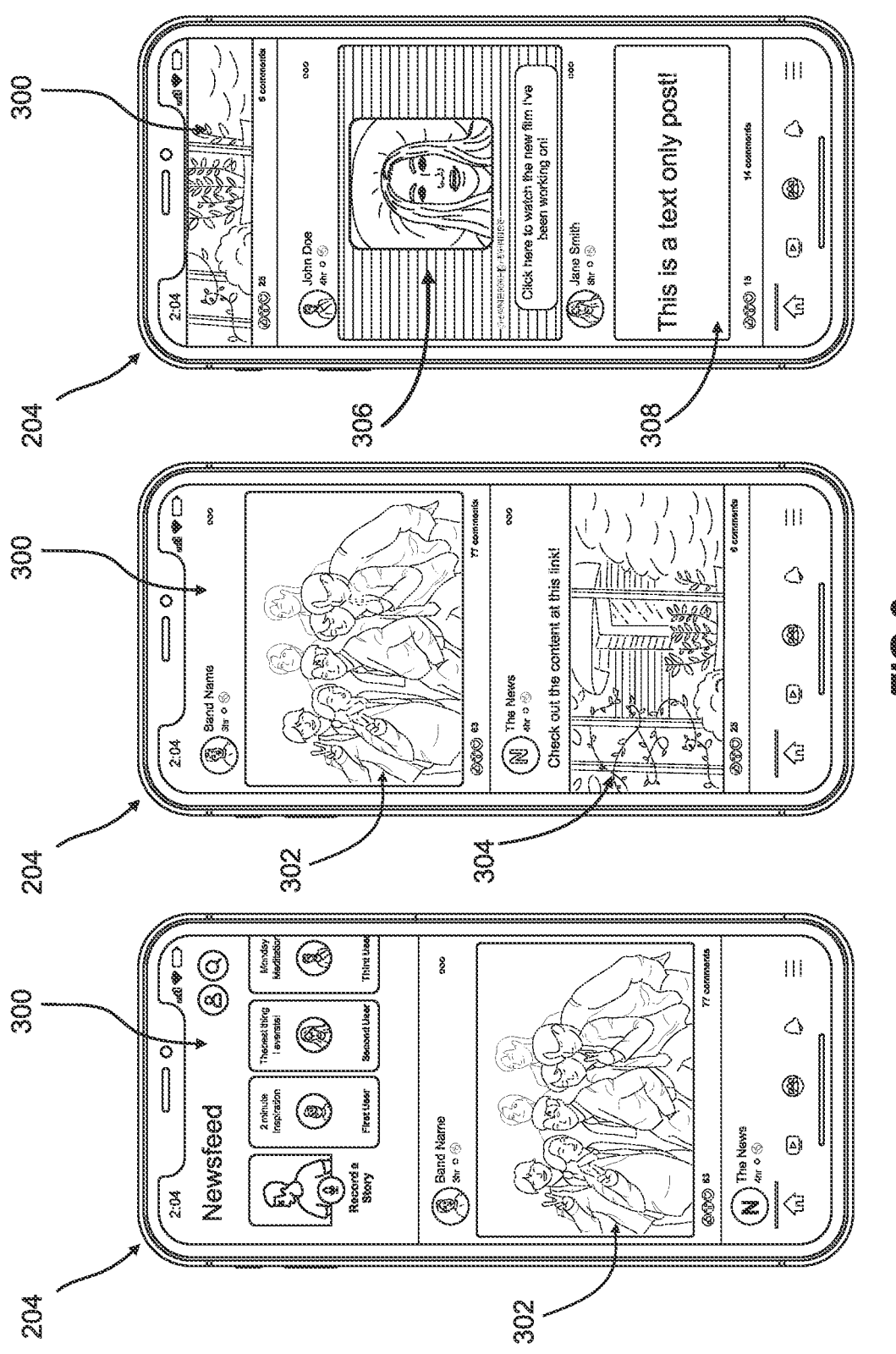
FIG. 3 is an illustration of an exemplary newsfeed interface provided as part of a digital social networking framework.

The term "newsfeed post" generally refers to any type or form of digital composition that may be displayed in a newsfeed. Newsfeed posts may include a variety of content. For example, a newsfeed post may include, without limitation, text, an image, a video, a set of multiple images and/or videos, and/or a link (e.g., to a post, webpage, article, film, etc.). FIG. 3 depicts an exemplary newsfeed interface 300 with a newsfeed that includes an image-based newsfeed post

302, a link-based newsfeed post 304, a video-based newsfeed post 306, and a text-based newsfeed post 308.

In some examples, a newsfeed post may include a viewing pane for the content of the newsfeed post (e.g., the text in a text-based post, the image in an image-based post, etc.). A newsfeed post may also display a text-based caption, metadata content (e.g., content describing users that have been tagged in the newsfeed post, a timestamp, etc.), information indicating the source of the newsfeed post (e.g., the name of the creator of the post, a profile image, etc.), and/or a digital special effect (e.g., a digital sticker, a filter, an-augmented reality element, etc.). Such information and/or features may be displayed (and/or a menu corresponding to such information and/or features may be displayed) within the viewing pane (e.g., over the primary content), within the viewing pane and/or may be visually associated with the viewing pane (e.g., displayed beneath the viewing pane).

The newsfeed service may enable viewers of a newsfeed post to digitally respond to the newsfeed post in a variety of ways. In some examples, a newsfeed interface may enable a user to comment on a newsfeed post (e.g., via a text, image, and/or video-based reply) and may create a digital thread of comments corresponding to the newsfeed post (e.g., displayed beneath the newsfeed post and/or accessible via a comments affordance).

As another example, social media platform 208 may provide a digital stories service. The digital stories service may provide users with a digital stories feed, which presents a continuous series of digital story posts to a story-consumer, one by one (e.g., in a slideshow format). The term "digital story post" may generally refer to any type or form of digital composition intended for a digital stories feed. A digital story post may include a variety of content (e.g., a digital photograph, a graphic, text, a digital video, an artificial reality element, a digital audio recording, etc.). In one example, the story consumption channel may transition from presenting one digital story post to the next automatically, without requiring any user input to do so. In some examples, digital story posts from the same source (e.g., created and/or posted by the same user) may be grouped together, such that each digital story post from a particular source is displayed prior to displaying digital story posts from another source.

Figure 4:
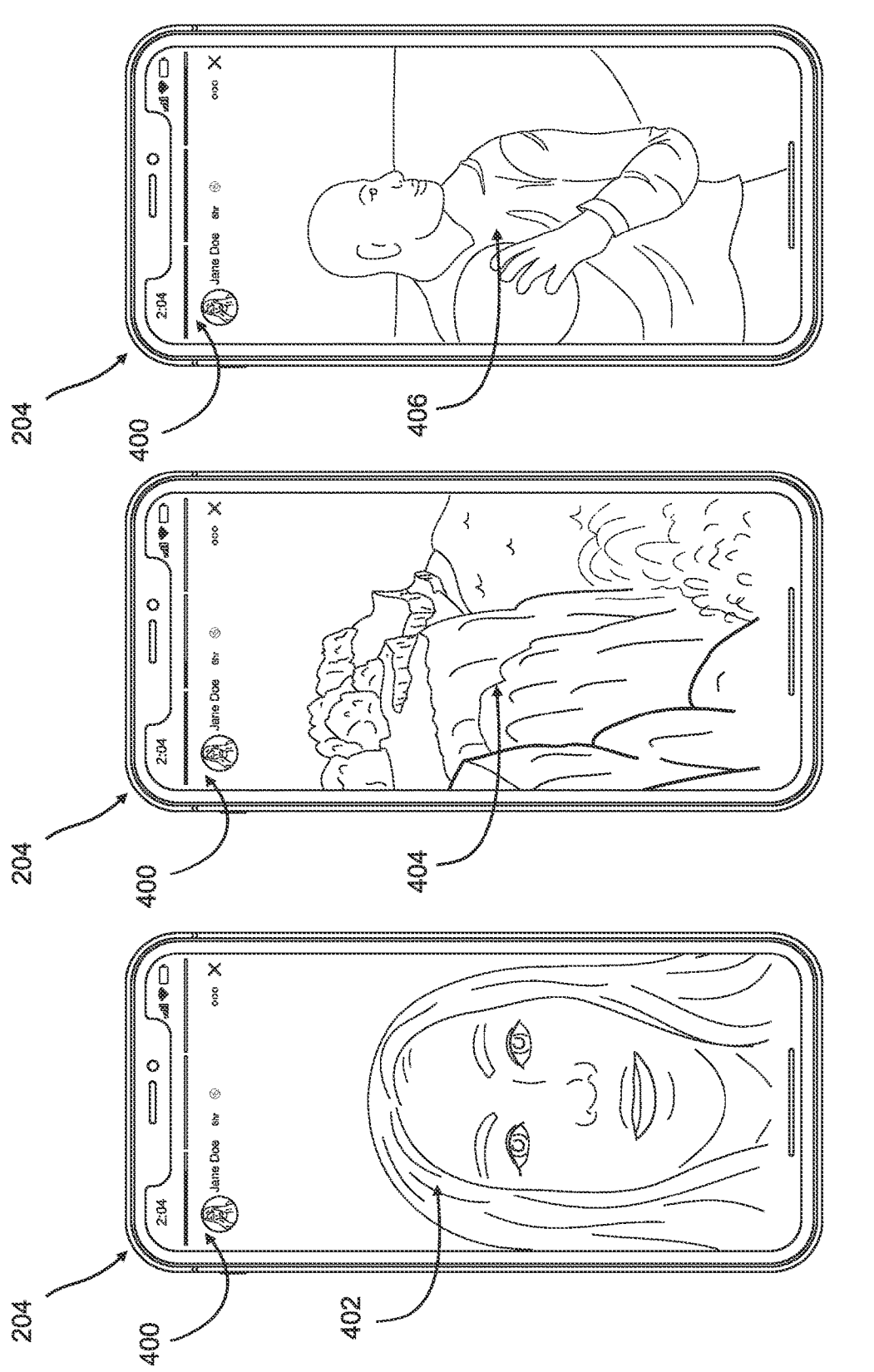
FIG. 4 is an illustration of an exemplary digital stories interface provided as part of a digital social networking framework.

In one embodiment, a digital story post may be ephemeral. That is, the digital story post may only be viewable for a predetermined amount of time. For example, a digital story post may be set to disappear after twenty-four hours. Similar to the newsfeed service, the digital stories service may enable viewers of a story post to comment on the post, via a text and/or image-based reply and/or reply story, creating a digital thread of comments. Also similar to the newsfeed service, the digital stories service may configure a story feed for a particular user that includes connected content (e.g., story posts created by users who are contacts of the particular user or being followed by the particular user), non-connected content, or a determined ratio of connected content to non-connected content. FIG. 4 depicts an exemplary story interface 400 showing digital story posts 402, 404, and 406 of a user's digital story.

Figure 5:
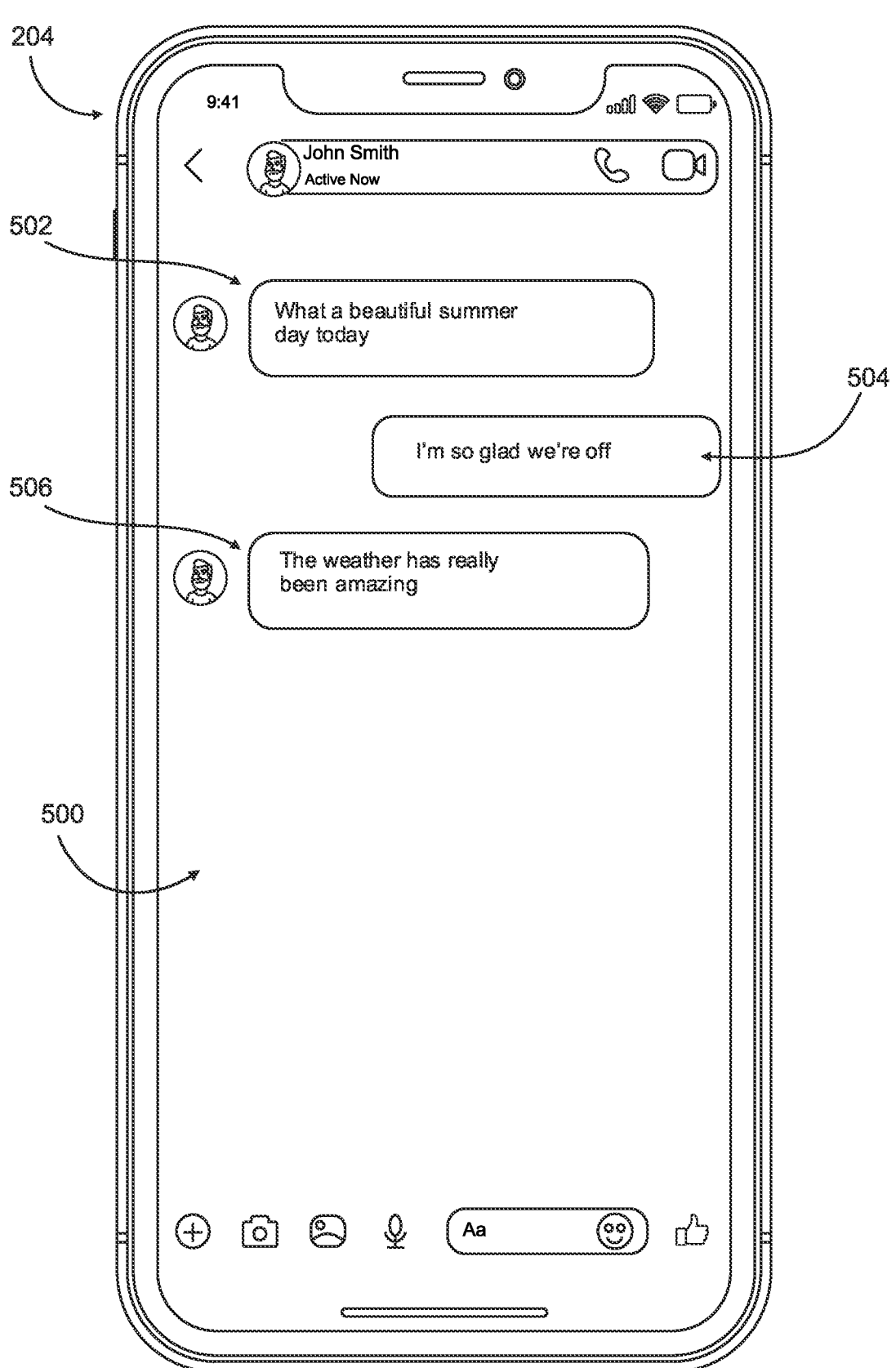
FIG. 5 is an illustration of an exemplary messaging interface provided as part of a digital social networking framework.

As another example, social media platform 208 may provide a messaging service. The term "messaging service" may generally refer to any type or form of digital message delivery system that enables users of social media platform 208 to exchange messages (e.g., text messages, audio messages, and/or video messages). FIG. 5 depicts an exemplary messaging interface 500 showing digital message posts 502, 504, and 506 of a digital messaging thread.

In some examples, social media platform 208 may provide a short-form video service (e.g., a reels service) that enables users to create short-form videos and/or consume (e.g., watch and/or digitally respond to) short-form videos created by other users. In one embodiment, social media platform 208 may create a short-form video feed for each user of its short-form video service. The term "short-form video" may generally refer to a digital video configured for short-form video feed consumption. In some examples, a platform for creating and/or posting a short-form video may only enable the creation and/or posting of short-form videos that are a certain length and/or that are less than a certain length (e.g., less than thirty seconds in length).

The term "short-form video feed" may generally refer to a series (e.g., a queue) of digital short-form videos (e.g., selected for a particular user) that a social media application (or a corresponding webpage) is configured to play, one by one, as a continuous series (e.g., advancing from one short-form video to the next automatically). In some examples, a short-form video feed may be configured to play short-form videos asynchronously (e.g., to play a continuously evolving queue of pre-recorded short-form videos). In some examples, short-form videos may be continuously added to a user's short-form video feed as the short-form videos of the feed are consumed (e.g., such that a determined number of short-form videos are always in queue to be played).

Figure 6:
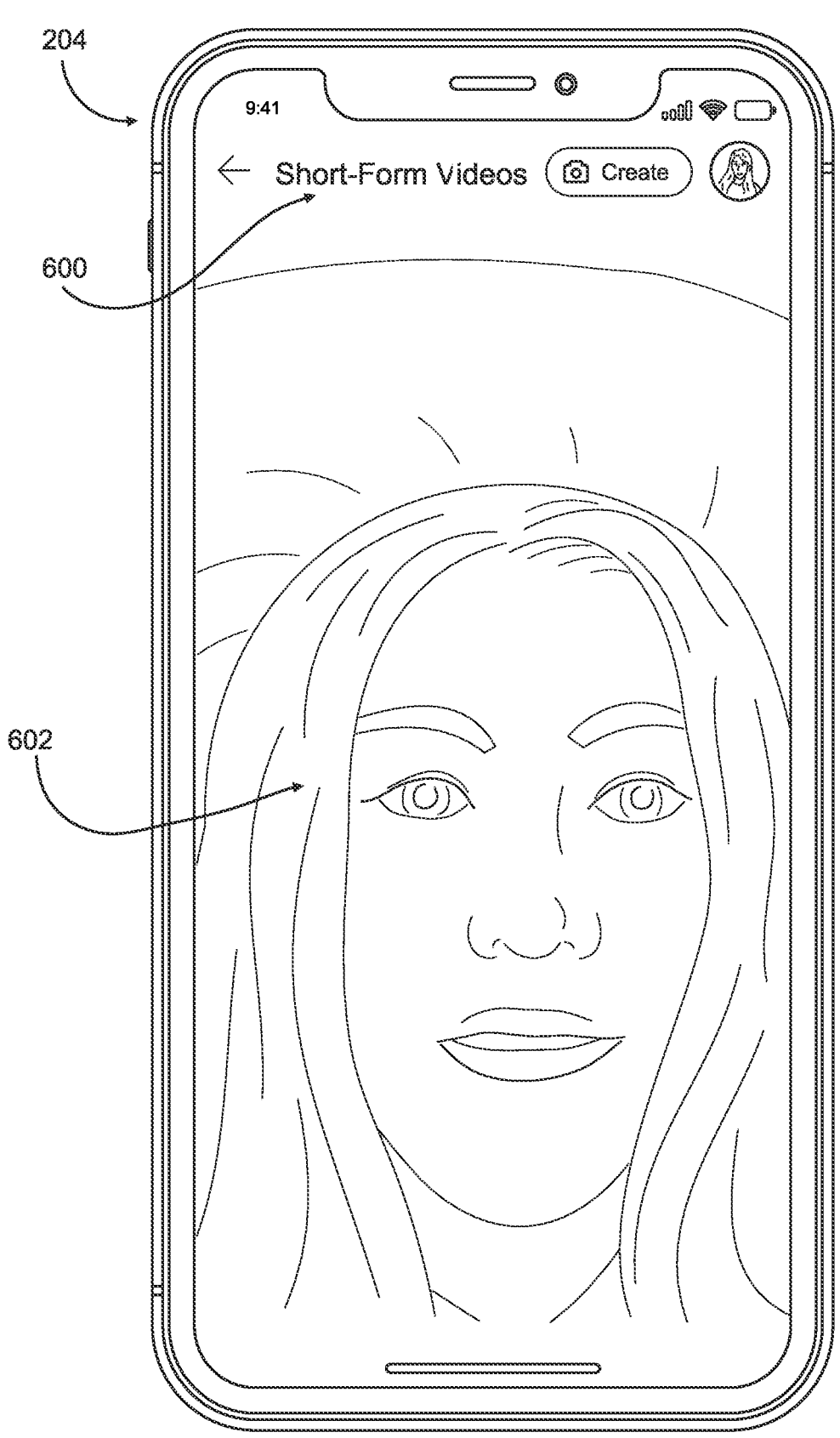
FIG. 6 is an illustration of an exemplary short-form video consumption interface provided as part of a digital social networking framework.

In some examples, a short-form video feed may be presented via a dedicated short-form video feed interface. FIG. 6 depicts an exemplary dedicated short-form video feed interface 600 presenting a short-form video 602. Short-form videos may be selected for the short-form video feed of a particular user based on a variety of metrics. For example, a short-form video may be selected based on a topic the short-form video has been tagged with (e.g., in response to a determination that the particular user is interested in and/or predicted to be interested in the topic). As another example, a short-form video may be selected based on a user who created the short-form video (e.g., in response to a determination that the particular user is following the user and/or is predicted to be interested in content by the creator). As another example, a short-form video may be selected based on a popularity of the short-form video.

In some embodiments, a short-form video may be displayed (e.g., streamed) with a variety of information relating to the short-form video. Such information may include, for example, a name and/or profile element of an account that created the short-form video, a title of the short-form video, viewer responses to the short-form video and/or an affordance that navigates to viewer responses to the short-form video, one or more elements for providing a digital social response to the short-form video, a transcript of the short-form video, etc.

Figure 7:
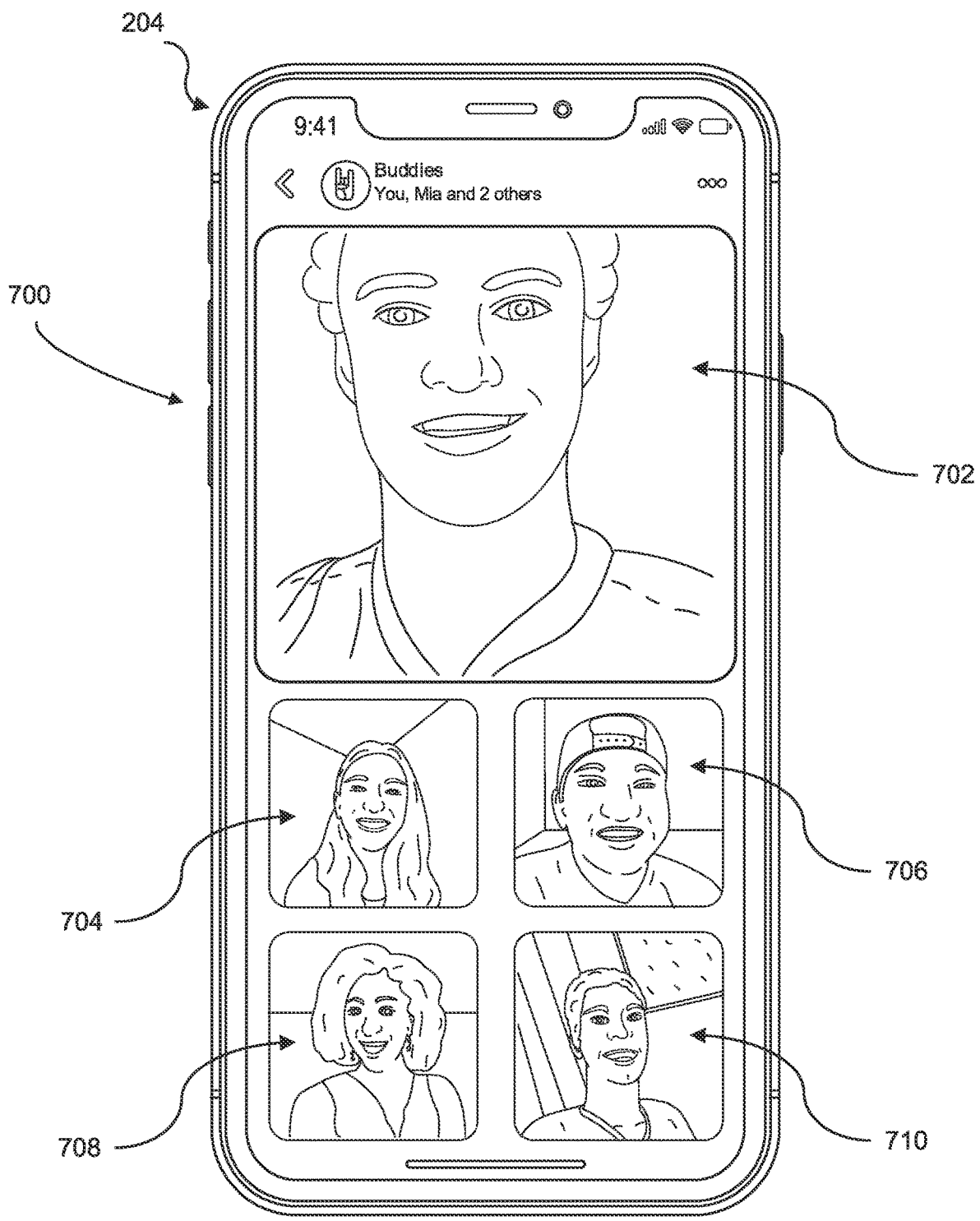
FIG. 7 is an illustration of an exemplary media conferencing interface provided as part of a digital social networking framework.

As another example, social media platform 208 may provide a media conferencing (e.g., audioconferencing and/or videoconferencing) service (e.g., a "rooms" service) for hosting media calls (e.g., audio calls and/or video calls). The media conferencing service may operate as a stand-alone service and/or may be integrated with another service (e.g., a messaging service, a social workplace service, etc.). The term "media conferencing service" refers to any type or form of streaming and/or videotelephony service that enables the digital transmission and/or sharing of real-time media (e.g., video and/or audio) streams (e.g., from multiple endpoints) via a media conferencing interface. The term "real-time media stream" generally refers to any type or form of multimedia that is transmitted in real time (e.g., as a series of frames) from an endpoint (i.e., a transmitting device) to one or more additional endpoints. Audio and/or frames may be played and/or displayed by an endpoint (to a user) as the audio and/or frames are received. FIG. 7 depicts an exemplary videoconferencing interface 700 with video tiles 702, 704, 706, 708, and 710 (each presenting a video stream of a user).

In one embodiment, social media platform 208 may provide a dating service that enables users to view and/or connect with potential dating matches (i.e., recommended dating matches). The dating service may select potential dating matches for a user (e.g., algorithmically) using any type or form of recommended match selection system. In some examples, the dating service may enable a user to create a digital dating profile. The digital dating profile may be presented, via an interface of a dating application (e.g., within a digital profile card), to additional users of the dating service for whom the user has been selected as a potential dating match. Additionally, the digital dating profiles of the additional users may be presented to the user (e.g., where each digital dating profile is presented in a different digital profile card).

Figure 8:
FIG. 8 an illustration of an exemplary recommended-dating-matches interface of a dating service provided as part of a social networking framework.

Upon presenting a user with a potential dating match via an interface of a dating application, the dating service may enable the user to digitally accept or reject the potential dating match. If the user digitally accepts a potential dating match corresponding to an additional user who has also accepted the user as a potential dating match (a mutual match), both users may be notified of the same. In some examples, a mutual match may enable additional user action (e.g., may enable messaging between the two users). FIG. 8 provides an exemplary depiction of a profile card 800 of a potential dating match being presented to user 206 in a recommended-matches interface, presented via a dating application, configured to present a queue of recommended dating matches selected for user 206 (e.g., by the dating application).

In some examples, the dating service may enable a user who has a dating account with the dating service to designate one or more contacts as a matchmaker for the dating account. A matchmaker designation may enable a contact to perform one or more digital matchmaking actions. For example, a matchmaker designation may enable a contact to view potential dating matches selected for the user. In some examples, a matchmaker designation may enable a contact to conditionally accept or reject a potential dating match and/or to conditionally message a potential dating match. In these examples, the user may be notified of the contact's conditional actions (e.g., and enabled to approve such actions). Additionally or alternatively, the matchmaker designation may enable a contact to annotate a profile card of a potential dating match (e.g., with digital annotations configured to be presented to the user). In some examples, the matchmaker designation may enable a contact to view a dating-analytics dashboard generated for the user (as will be discussed presently in connection with steps 110-130 of FIG. 1).

Returning to FIG. 1, at step 110, one or more of the systems described herein may provide a selectable dashboard element within an interface of a dating application configured for a user of the dating application. For example, as illustrated in FIG. 2, a media module 212 may provide, for user 206 with a dating account 214 accessed via dating application 210, a selectable dashboard element 216 within an interface 218 of dating application 210 configured for user 206.

Dating application 210 may generally represent any type or form of user application configured to provide user 206 with access to a dating service maintained by social media platform 208. In some examples, dating application 210 may represent a dedicated dating application. In other examples, dating application 210 may represent a general social media application that enables access to multiple social media services (e.g., two or more of the social media services described previously) including a dating service.

Interface 218 may represent any type or form of interface presented to user 206 via dating application 210. In some examples, interface 218 may represent a homepage, a profile page, a settings page, and/or a recommended dating matches page. In one embodiment, selectable dashboard element 216 may be presented (e.g., in a persistent location) within multiple interfaces of dating application 210 provided to user 206.

In some examples, interface 218 may represent an interface of a digital matchmaker center, provided within dating application 210, configured for user 206 and one or more additional users designated by user 206 with a matchmaker designation. In these examples, the digital matchmaker center may provide user 206 and the one or more additional users with access to a variety of content and may enable a variety of digital user actions. For example, the digital matchmaker center may enable the one or more additional users to access the profile cards of user 206's recommended dating matches in a matchmaker mode (e.g., which may enable the one or more additional users to view the recommended dating matches and conditionally accept and/or reject the recommended dating matches and/or to annotate the profile cards). In some examples, the digital matchmaker center may maintain shared streaming spaces (e.g., that enable co-viewing of the profile cards of user 206's recommended dating matches).

At step 120, one or more of the systems described herein may receive user input selecting the dashboard element. For example, as illustrated in FIG. 2, media module 212 may receive user input 220 selecting selectable dashboard element 216. In response to receiving the user input, one or more of the systems described herein may, at step 130, present a digital dating-analytics dashboard that provides information relating to the user's dating history aggregated via the dating application. For example, as illustrated in FIG. 2, media module 212 may, in response to receiving user input 220, present a dashboard 222 that provides information 224 relating to user 206's dating history aggregated via dating application 210.

Media module 212 may present dashboard 222 in a variety of contexts. In some examples, media module 212 may present dashboard 222 to user 206 via an instance of dating application 210 installed on user device 204. Additionally, in examples in which interface 218 represents an interface of a digital matchmaker center, media module 212 may present dashboard 222 to an additional user, designated as a matchmaker, via an instance of dating application 210 installed on a device of the additional user (e.g., via a digital matchmaker center of dating application 210 provided to the additional user). In these examples, user 206 may have granted the additional user with access rights to dashboard 222 (e.g., via a settings interface).

Figure 9:
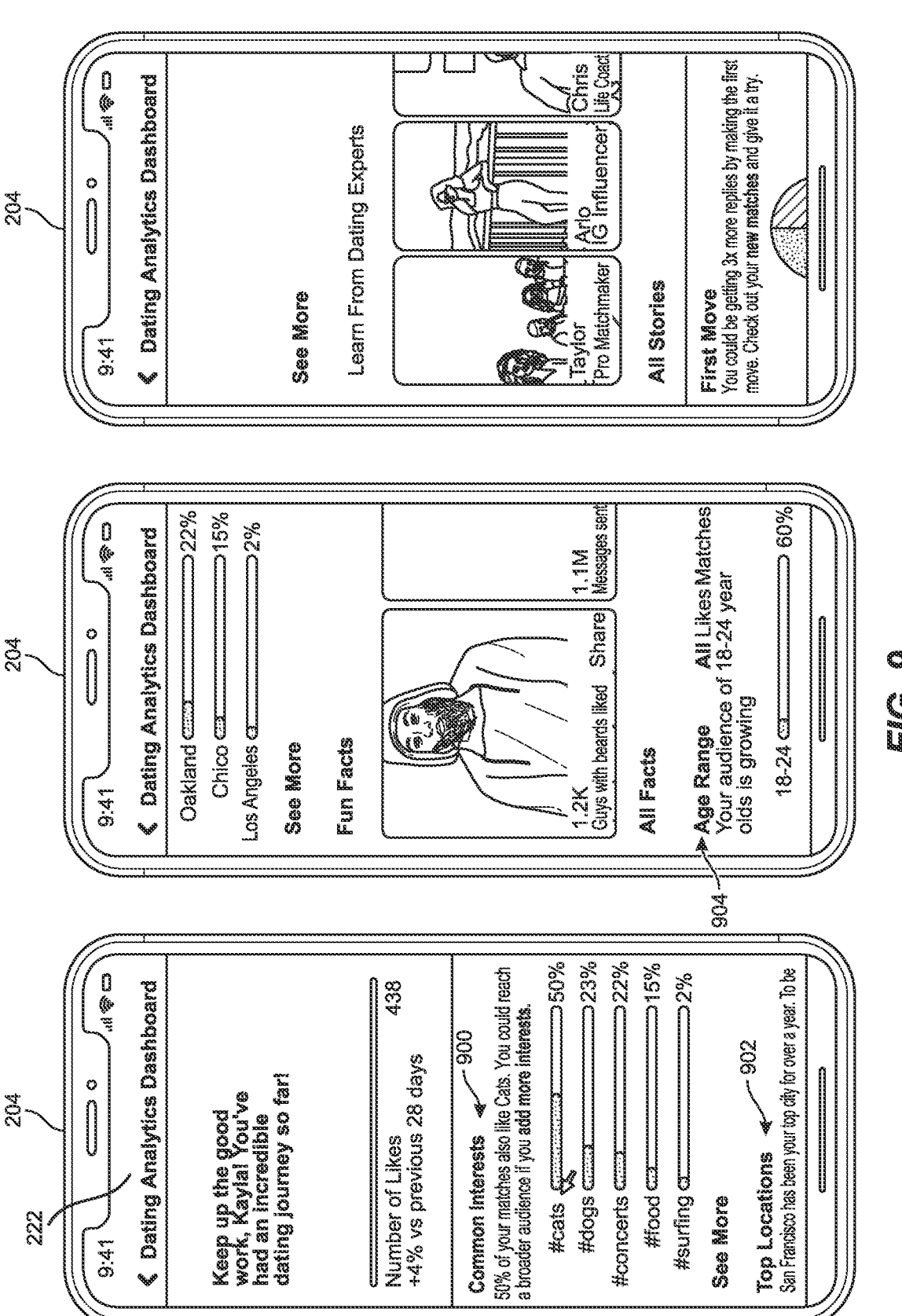
FIG. 9 is an illustration of an exemplary dating-analytics interface.

Dashboard 222 generally represents any type or form of interface or portion of an interface that presents information 224. FIG. 9 depicts an exemplary dashboard 222. Prior to presenting dashboard 222, media module 212 may generate dashboard 222. Media module 212 may configure dashboard 222 to include a variety of dating history content. For example, media module 212 may (1) determine a percentage of user 206's dating matches (e.g., all matches recommended by social media platform 208, matches accepted by user 206, and/or mutual matches) that share a particular interest with user 206 and (2) provide the determined percentage as part of information 224 presented within dashboard 222 (e.g., within a common interests section such as common interests section 900 presented in FIG. 9).

As another example, media module 212 may (1) identify locations and/or ages associated with user 206's dating matches (e.g., all matches recommended by social media platform 208, matches accepted by user 206, and/or mutual matches) and (2) provide the locations within a matches-locations summary, and/or the ages within a matches-ages summary, as part of information 224 provided within dashboard 222 (e.g., within a locations summary section such as location summary section 902 in FIG. 9 and/or an age summary section such as age summary section 904 in FIG. 9)

Additionally or alternatively, media module 212 may (1) identify a user dating-engagement metric corresponding to user 206 (e.g., a number of messages sent by user 206 via dating application 210, a number of dating matches reviewed by user 206 via dating application 210, a number of dating matches accepted by user 206 via dating application 210, and/or a number of dating matches rejected by user 206 via dating application 210) and (2) provide the user dating-engagement metric as part of information 224 provided within dashboard 222. Similarly, media module 212 may (1) identify a metric of match engagement (e.g., a number of likes received in a designated time period) and (2) provide the metric as part of information 224 provided within dashboard 222.

In some examples, dashboard 222 may include information aggregated for a designated time period (e.g., the last year and/or the last thirty days). In one embodiment, dashboard 222 may include information aggregated for multiple time periods. In this embodiment, dashboard 222 may (in some examples) compare information across different time periods. In some such embodiments, dashboard 222 may enable user 206 to toggle between views of information aggregated for each of the different time periods.

In some examples, dashboard 222 may include information aggregated for different groups of matches (e.g., information aggregated for all matches recommended by social media platform 208, information aggregated for only matches accepted by user 206, and/or information aggregated for only mutual matches). In these examples, dashboard 222 may enable user 206 to toggle between views of information aggregated for each of the groups (e.g., as depicted in FIG. 9).

In addition to content relating to user 206's dating history, in some examples, dashboard 222 may be configured to include digital self-help content. Such content may be selected for dashboard 222 in a variety of ways. In some examples, self-help content may be related to a finding presented within dashboard 222. In these examples, the self-help content may be selected in response to media module 212 (1) identifying the finding and (2) determining that the self-help content relates to the finding. As a specific example, media module 212 may select a self-help article relating to initiating conversation in response to determining that user 206 has initiated messaging with a percentage of mutual matches that falls below a threshold percentage. Other factors for selecting self-help content may include, without limitation, a popularity of the self-help content and/or a predicted user interest in the self-help content (e.g., predicted for user 206 based on content consumed and/or digitally engaged with by user 206 in the past). In some examples, the self-help content may take the form of a short-form video (e.g., an influencer reel). Additionally or alternatively, the self-help content may take the form of an article, a meme, and/or a story.

In some examples, dashboard 222 may include one or more digital tips for improving user 206's dating profile, generated automatically based on a computer-generated analysis of user 206's dating profile and/or dating history with dating application 210. As a specific example, dashboard 222 may suggest that user 206 list more interests, list a particular interest that is indicated in another profile of user 206 (e.g., a profile maintained by another service of social media platform 208) and that is trending within dating application 210, send a first message to more mutual matches, etc.

In some examples, media module 212 may (1) generate a social media composition (e.g., a short-form video, a digital story, and/or a newsfeed post), configured for a social media consumption channel of social media platform 208 (e.g., a short-form video feed, a story feed, and/or a newsfeed), based on dashboard 222 and (2) enable user 206 to share the social media composition. In one such example, the social media composition may be generated automatically (e.g., as part of generating dashboard 222). In another example, the social media composition may be generated in response to user input requesting that the social media composition be generated. In some such examples, dashboard 222 (and/or an interface displaying dashboard 222) may include a composition-creation element configured to trigger the social media composition to be created when selected via user input. In one embodiment, (1) the composition-creation element may enable user 206 to select a social media consumption channel to which user 206 wishes to share dashboard 222 and (2) media module 212 may generate a social media composition, based on dashboard 222, that corresponds to the selected social media consumption channel.

Figure 10:
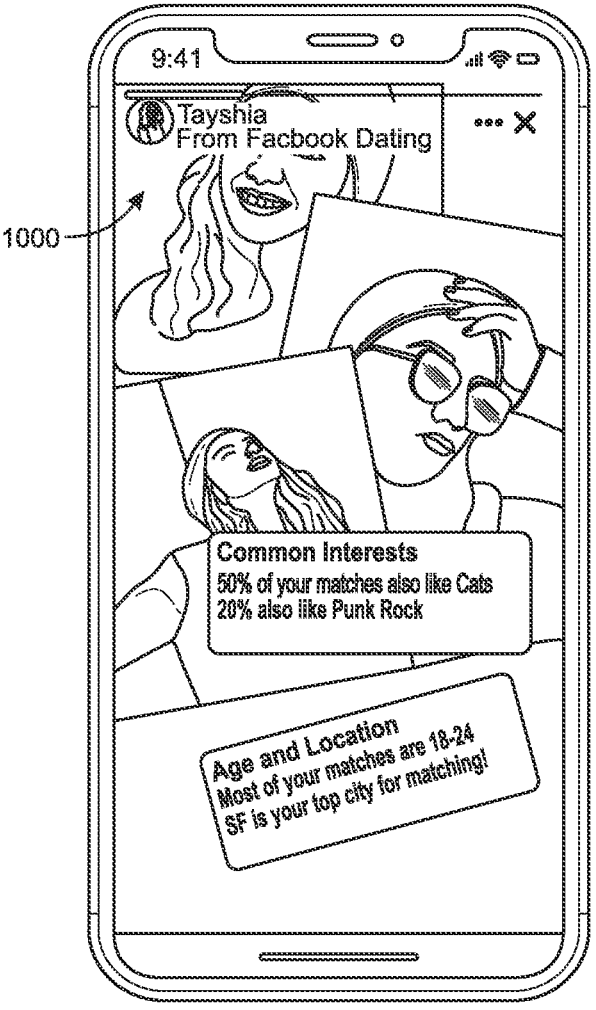
FIG. 10 is an illustration of exemplary dating-analytics story.

In examples in which media module 212 generates a social media composition based on content included within dashboard 222, media module 212 may configure the social media composition in any format, with any visual configuration, and/or to include any of the content presented within dashboard 222. FIG. 10 depicts an exemplary social media story 1000 generated based on content from dashboard 222. In some examples, dashboard 222 may present public social media compositions (based on the dating-analytics dashboards of other users) shared by the other users of dating application 210.

In addition (or as an alternative) to providing user 206 with dashboard 222, in some examples, media module 212 may enable user 206 to create a shareable version of user 206's dating profile configured to be shared to social media platform 208. In some examples, dating profiles may, by default, be private (i.e., sharing to social media consumption channels may not be permitted). In some such examples, a user may only access another user's dating profile if (1) the other user's dating profile is recommended to the user as a potential dating match (e.g., is provided to the user within a queue of recommended dating matches selected for the user), (2) the other user has designated the user as a matchmaker for the other user's dating account, and/or (3) the other user generates a shareable version of the user's dating profile that may be shared outside dating application 210.

In some examples, the shareable version of user 206's dating profile may coincide with a particular social media service of social media platform 208. For example, media module 212 may enable user 206 to create a message version of user 206's dating profile configured for a messaging thread (e.g., such as digital message 1200 depicted in FIG. 12), a digital story version of user 206's dating profile configured for a digital story feed (e.g., such as digital story 1300 depicted in FIG. 13), and/or a newsfeed version of user 206's dating profile configured for a newsfeed (e.g., such as newsfeed post 1400 depicted in FIG. 14). In one example, the shareable version may be configured to enable resharing by other users of social media platform 208. In some such examples, user 206 may enable which users are able to reshare the shareable version of user 206's dating profile (e.g., friends of user 206, all users, select friends, etc.).

The shareable version of user 206's dating profile may include a variety of features. In some examples, the shareable version may include a link to user 206's dating profile. A selection of the link from a user device of an additional user who has a dating account with dating application 210 may be configured to surface, via an instance of dating application 210 installed on the additional user's device, a profile card corresponding to user 206's dating profile. In one embodiment, the profile card may include a feature (e.g., such as the accepting or rejecting elements presenting in FIG. 8) that enables the additional user to accept or reject user 206 as a potential dating match. In one example, a selection of the link from an additional user who has a dating account with dating application 210 may additionally trigger a profile card of the additional user to be added to a queue of recommended dating matches presented to user 206. In some examples, a selection of the link from an additional user who does not have a dating account with dating application 210 may surface an interface prompting the additional user to create a dating account with dating application 210.

In some examples in which the shareable version of user 206's dating profile includes a link, the link may be subject to an expiration period, after which the link will no longer navigate to user 206's dating profile. In some examples, the expiration period may be set automatically (e.g., for 24 hours). Additionally or alternatively, the expiration period may be configured by user 206 (e.g., as part of a shareable dating profile creation process).

Figure 11:
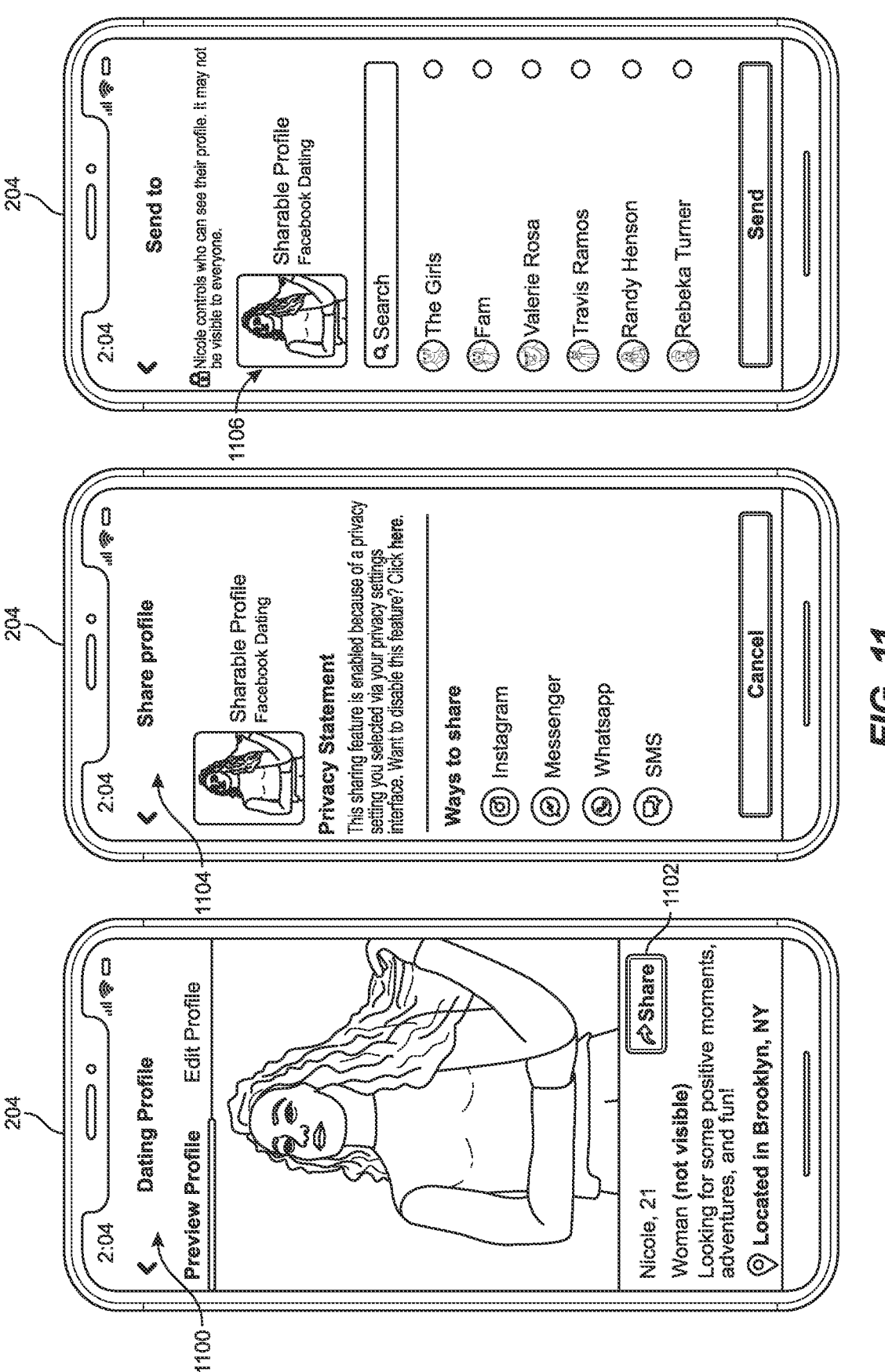
FIG. 11 is an illustration of exemplary interface flow for sharing a dating profile.
Figures 12, 13, 14:
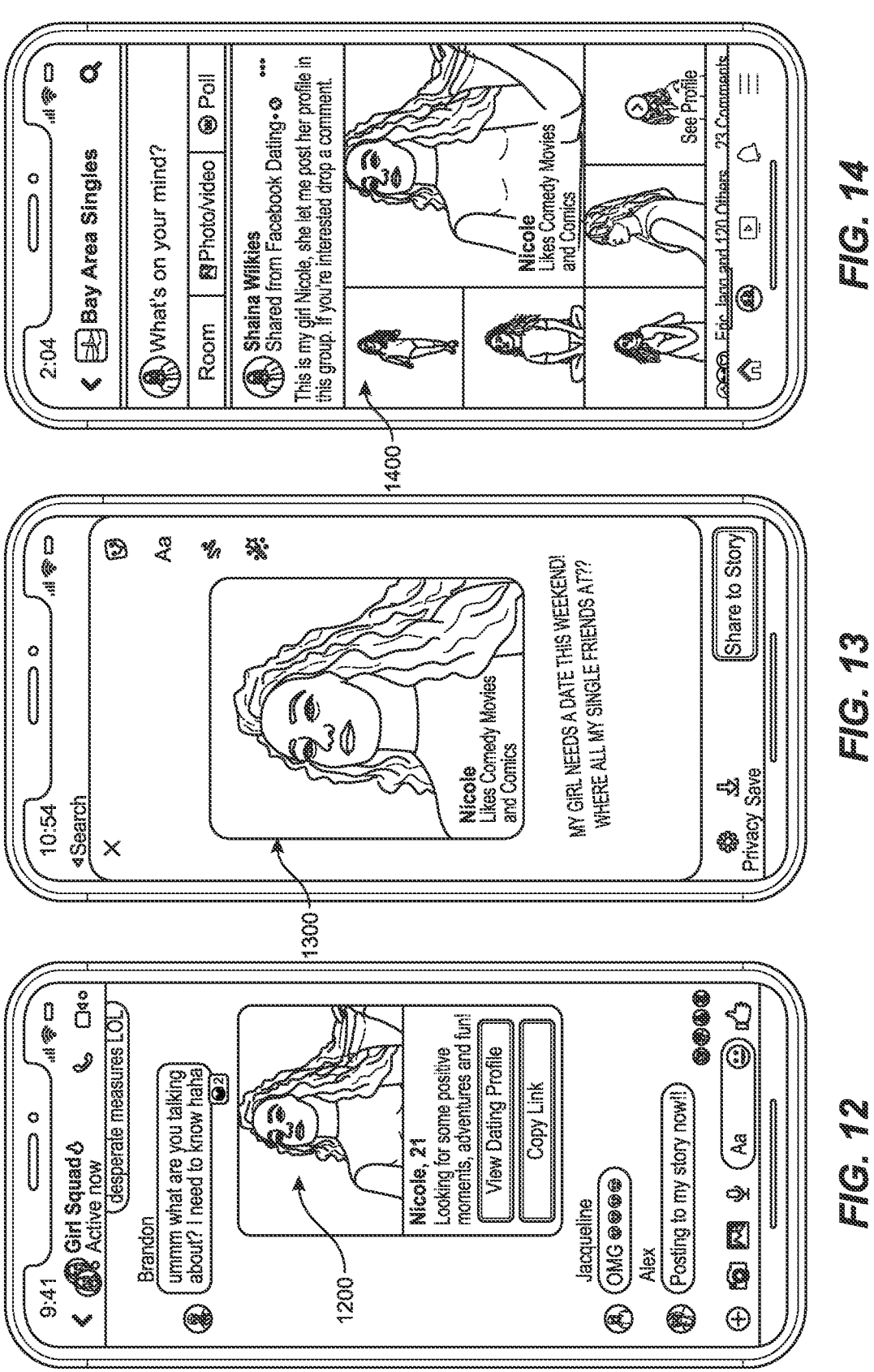
FIG. 12 is an illustration of an exemplary messaging interface to which a dating profile has been shared.
FIG. 13 is an illustration of an exemplary story interface to which a dating profile may be shared.
FIG. 14 is an illustration of an exemplary newsfeed interface to which a dating profile has been shared.

In some examples, a shareable dating profile creation process may enable user 206 to easily create shareable versions of user 206's dating profile that are configured for multiple different social media channels. FIG. 11 depicts an exemplary creation flow that may be initiated from a dating profile editor interface 1100 by selecting a share element 1102. A selection of share element 1102 via user input may surface a share interface 1104 that includes multiple different channels to which the shareable version of user 206's dating profile may be shared. A selection of a channel may be configured to trigger media module 212 to (1) generate a shareable version of user 206's dating profile that corresponds to the selected channel and/or (2) share the generated shareable version of user 206's dating profile to the selected channel.

In some examples, different shareable versions of user 206's dating profile may have different configuration. For example, (1) a version configured to be sent as a message in a messaging thread may include a single photo and a selectable element configured, when selected, to surface user 206's dating profile within dating application 210, (2) a version configured to be shared as a story may present photos from user 206's dating profile one after another in a slideshow format, and/or (3) a version configured to be shared as a newsfeed post may present photos from user 206's dating profile as a collage. In some examples, the disclosed dating framework may enable user 206 to share a shareable version of user 206's dating profile with specific users (e.g., contacts of user 206 selected via an interface such as contact-selection interface 1106 in FIG. 11).

User interfaces corresponding to the methods and systems described above may be surfaced as part of a variety of navigational flows (e.g., a variety of dating service flows and/or social media composition creation flows). In some examples, a navigational flow may include a combination of user interfaces described herein and additional user interfaces not described herein. Each user interface described herein may be surfaced from a variety of entry points. In some examples, the user interfaces described here may be interconnected (e.g., with one interface navigating to another).

In the embodiments depicted in the figures herein (e.g., FIGS. 3-14), the exemplary interfaces have been optimized for a mobile device. Additional or alternative embodiments of these exemplary interfaces may be optimized for other types of computing devices (e.g., a desktop computer, a laptop computer, a wearable device, etc.). In some examples, some or all of the content of these interfaces may be dynamically modified (e.g., customized for a particular user). For example, the profile cards of recommended dating matches for a user's queue of recommended dating matches may be dynamically selected (e.g., based on a variety of inputs, as will be described in greater detail below).

Each of the computer-mediated actions described herein may be performed by a module (e.g., media module 212) that operates within an endpoint device (e.g., user device 204) and/or that operates within a backend server (e.g., server 202). In the examples in which an action involves presenting digital content to a user via an endpoint device and/or receiving user input and/or digital feedback from the user to the endpoint device, the module may perform the action directly, in examples in which the module operates within the endpoint device (e.g., by displaying content via a display element of the endpoint, receiving tapping input to a touchscreen of the endpoint device, and/or receiving input to an auxiliary device communicatively coupled to the endpoint device such a digital mouse and/or a keyboard), and/or indirectly (e.g., in examples in which the module operates within the server). In examples in which a module performs an action indirectly, the module may perform the action in a variety of ways. For example, the module may perform the action by instructing the endpoint device to perform the action, by transmitting content to the endpoint device to be presented by the endpoint device, by providing the endpoint with an application (e.g., dating application 210) that performs the action, by receiving an indication of user input to the endpoint device from the endpoint device, etc. Additionally, in some examples, the module may perform an action operating in a combination of an endpoint device and a backend server.

Each of the digital actions described above may be performed in conjunction with a permissions framework (e.g., a data privacy framework) that enables a user to select how data is selected for the user, how data relating to the user is collected, and how data relating to the user is shared with other users. In some examples, user 206 may provide permission for an action via a digital permissions process (e.g., via input to a permissions menu and/or page). In some examples, the digital permissions process may be directed to selecting an audience for a user generated post. Additionally or alternatively, the digital permissions process may be directed to permitting information about the user (e.g., a status and/or availability) to be broadcast (e.g., within a profile element and/or contact list). As another example, the digital permissions process may be directed to collecting user history (e.g., to apply to a machine learning system used to select content for the user). In one example, the digital permissions process may be directed to enabling a user of a dating application to designate a contact as a matchmaker and select access rights for the contact.

In some of the embodiments described above, the disclosed systems may enable a user to create content (e.g., a social media post for a social media feed and/or a digital message for a private digital messaging thread) via a content-creation interface (e.g., an interface provided via a dating application in connection with a dating-analytics dashboard). In these embodiments, the content-creation interface may enable a content creation that includes a variety of types of content. Such content may include, without limitation, an image, a video, audio content, a graphic (e.g., a digital sticker), a special effect (e.g., an augmented reality effect), a filter, etc. The content-creation interface may enable a user to provide content (e.g., for a digital composition such as a post and/or message) in a variety of ways.

In some examples, the content-creation interface may enable a user to create (e.g., generate) content via the content-creation interface. For example, the content-creation interface may include a digital canvas that enables a user to digitally draw content and/or may include a capture screen that enables the user to capture visual content via a camera of the user's device and/or audio content via a microphone of the user's device. As another example, the content-creation interface may include a text-input box that enables the user to input text (e.g., via typing input). Additionally or alternatively, the content-creation interface may enable the user to upload content. For example, the content-creation interface may include a drag-and-drop functionality and/or may present content (e.g., images stored in a camera roll of the user's device where permission to access the images has been provided) that may be selected to be included in the user's content creation.

In addition to enabling a user to provide (e.g., create and/or upload) content, the content-creation interface may enable a user to modify (e.g., customize) content. For example, the content-creation interface may include a text-customization feature that enables a user to customize the appearance of text (e.g., selecting a size, color, font, and/or position of text). As another example, the content-creation interface may enable a user to select a filter and/or special effect to be applied over content. In examples in which the content-creation interface is provided in connection with a dating-analytics dashboard, the content-creation interface may automatically include content from the dating-analytics dashboard in a composition and/or may automatically provide a user with content from the dating-analytics dashboard that the user may select to include (e.g., by dragging and dropping) in the composition.

In some of the embodiments described above, a module (e.g., media module 212) may select content for user 206. For example, a module may select social media consumption content for user 206 (e.g., a social media composition for a social media feed and/or a social media feed relating to a particular topic or theme) and/or suggested additional users for user 206 (e.g., users with whom to co-view a social media feed, a digital group to join, a recommended dating match, etc.). In these embodiments, the module may select content for user 206 in a variety of ways. For example, social media consumption content may be selected based on a relationship between user 206 and a creator of the social media consumption content (e.g., in response to determining that the creator is a contact of user 206 and/or that user 206 is following the creator), a user history and/or demographic of user 206 (e.g., indicative of a user interest), user data relating to a contact of user 206 and/or users with a features in common with user 206, etc. As another example, an additional user may be selected for user 206 based on a relationship between user 206 and the additional user (e.g., a relationship claimed by user 206 within social media platform 208, a number of social connections between user 206 and the additional user such as a number of mutual contacts, and/or a metric relating to an amount of digital interaction between user 206 and the additional user within social media platform 208), a common interest identified between user 206 and the additional user, a common age range between user 206 and the additional user, a common geographic area between user 206 and the additional user (e.g., a common current location and/or a common hometown), etc.

In some examples, content may be selected for user 206 by a machine learning system (e.g., a neural network). In these examples, the machine learning system may select the content in response to receiving a variety of inputs. Such inputs may include inputs relating to user 206 (e.g., an input derived from a user history, an expressed user preference, etc.), inputs relating to users with a features in common with user 206, inputs relating to a demographic and/or a region associated with user 206, inputs derived from a social graph, inputs relating to potential content that may be selected for user 206 (e.g., a topic of such content and/or a popularity of such content), etc.

EXAMPLE EMBODIMENTS

Example 1: A computer-implemented method may include (1) providing a selectable dashboard element within an interface of a dating application configured for a user of the dating application, (2) receiving user input selecting the dashboard element, and (3) in response to receiving the user input, presenting a digital dating-analytics dashboard that provides information relating to the user's dating history aggregated via the dating application.

Example 2: The computer-implemented method of example 1, where the method further includes (1) generating a short-form video, configured for a social media consumption channel, based on the digital dating-analytics dashboard and (2) posting the short-form video to the social media consumption channel.

Example 3: The computer-implemented method of examples 1-2, where the method further includes determining a percentage of the user's dating matches that share a particular interest with the user and providing the determined percentage as part of the information provided within the digital dating-analytics dashboard.

Example 4: The computer-implemented method of examples 1-3, where the method further includes (1) identifying locations associated with a set of the user's dating matches and (2) providing the locations within a matches-locations summary as part of the information provided within the digital dating-analytics dashboard.

Example 5: The computer-implemented method of examples 1-4, where the method further includes identifying ages associated with a plurality of the user's dating matches and providing the ages within a matches-ages summary as part of the information provided within the digital dating-analytics dashboard.

Example 6: The computer-implemented method of examples 1-5, where the method further includes (1) identifying a user dating-engagement metric corresponding to the user and (2) providing the user dating-engagement metric as part of the information provided within the digital dating-analytics dashboard.

Example 7: The computer-implemented method of example 6, where the user dating-engagement metric includes and/or represents a number of messages sent by the user via the dating application, a number of dating matches reviewed by the user via the dating application, a number of dating matches accepted by the user via the dating application, and/or a number of dating matches rejected by the user via the dating application.

Example 8: The computer-implemented method of examples 1-7, where the method further includes providing self-help content within the digital dating-analytics dashboard.

Example 9: The computer-implemented method of example 8, the self-help content includes a stream of short-form videos.

Example 10: The computer-implemented method of examples 1-9, where the interface represents an interface of a digital matchmaker center, provided within the dating application, configured for the user and one or more additional users designated by the user with a matchmaker designation.

Example 11: The computer-implemented method of examples 1-10, where the method further includes enabling the user to create a shareable version of the user's dating profile configured to be shared to a social media platform and reshared by other users of the social media platform.

Example 12: A system for implementing the above-described method may include at least one physical processor and physical memory that includes computer-executable instructions that, when executed by the physical processor, cause the physical processor to (1) provide a selectable dashboard element within an interface of a dating application configured for a user of the dating application, (2) receive user input selecting the dashboard element, and (3) in response to receiving the user input, present a digital dating-analytics dashboard that provides information relating to the user's dating history aggregated via the dating application.

Example 13: The system of example 12, where the computer-executable instructions further cause the physical processor to (1) generate a short-form video, configured for a social media consumption channel, based on the digital dating-analytics dashboard and (2) post the short-form video to the social media consumption channel.

Example 14: The system of examples 12-13, where the computer-executable instructions further cause the physical processor to determine a percentage of the user's dating matches that share a particular interest with the user and provide the determined percentage as part of the information provided within the digital dating-analytics dashboard.

Example 15: The system of examples 12-14, where the computer-executable instructions further cause the physical processor to (1) identify locations associated with a set of the user's dating matches and (2) provide the locations within a matches-locations summary as part of the information provided within the digital dating-analytics dashboard.

Example 16: The system of examples 12-15, where the computer-executable instructions further cause the physical processor to identify ages associated with a plurality of the user's dating matches and provide the ages within a matches-ages summary as part of the information provided within the digital dating-analytics dashboard.

Example 17: The system of examples 12-16, where the computer-executable instructions further cause the physical processor to (1) identify a user dating-engagement metric corresponding to the user and (2) provide the user dating-engagement metric as part of the information provided within the digital dating-analytics dashboard.

Example 18: The system of example 17, where the user dating-engagement metric includes and/or represents a number of messages sent by the user via the dating application, a number of dating matches reviewed by the user via the dating application, a number of dating matches accepted by the user via the dating application, and/or a number of dating matches rejected by the user via the dating application.

Example 19: The system of examples 12-18, where the computer-executable instructions further cause the physical processor to provide self-help content within the digital dating-analytics dashboard.

Example 20: A non-transitory computer-readable medium may include one or more computer-readable instructions that, when executed by at least one processor of a computing device, cause the computing device to (1) provide a selectable dashboard element within an interface of a dating application configured for a user of the dating application, (2) receive user input selecting the dashboard element, and (3) in response to receiving the user input, present a digital dating-analytics dashboard that provides information relating to the user's dating history aggregated via the dating application.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory devices 226 and 228 in FIG. 2) and at least one physical processor (e.g., physical processors 230 and 232 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   providing a selectable dashboard element within an interface of a dating application configured for a user of the dating application;
   receiving user input selecting the selectable dashboard element;

in response to receiving the user input, presenting a digital dating-analytics dashboard with a common interests section that provides, for a particular interest of the user, a percentage of the user's dating matches that share the particular interest, wherein the percentage corresponds to a number of additional users, who accepted the user as a dating match and whom were accepted by the user as a dating match, that share the particular interest relative to a number of additional users, who accepted the user as a dating match and whom were accepted by the user as a dating match, that do not share the particular interest;

generating a short-form video, configured for a social media consumption channel, based on dating analytics of the digital dating-analytics dashboard relating to a dating history of the user; and posting the short-form video to the social media consumption channel.

2. The computer-implemented method of claim 1, further comprising:

identifying locations associated with a plurality of the dating matches of the user; and providing the locations within a matches-locations summary section of the digital dating-analytics dashboard.

3. The computer-implemented method of claim 2, wherein the matches-locations summary section comprises, for each location within a plurality of locations, a percentage of the dating matches of the user associated with the location.

4. The computer-implemented method of claim 1, further comprising:

identifying a user dating-engagement metric corresponding to the user; and providing the user dating-engagement metric within the digital dating-analytics dashboard.

5. The computer-implemented method of claim 4, wherein the user dating-engagement metric comprises at least one of:

a number of messages sent by the user via the dating application;

a number of dating matches reviewed by the user via the dating application;

a number of dating matches accepted by the user via the dating application; or a number of dating matches rejected by the user via the dating application.

6. The computer-implemented method of claim 1, further comprising providing self-help content within the digital dating-analytics dashboard.

7. The computer-implemented method of claim 1, wherein the particular interest comprises an interest extracted from a list of interests within a full dating profile of the user.

8. The computer-implemented method of claim 7, further comprising generating a first shareable version of the dating profile of the user that is separate from the full dating profile of the user and is configured to be shared to a social media platform and reshared by other users of the social media platform.

9. The computer-implemented method of claim 8, further comprising generating a second shareable version of the dating profile of the user that is separate from the dating profile of the user and the first shareable version of the dating profile of the user, wherein the second shareable version of the dating profile of the user includes different information than the first shareable version of the dating profile of the user, and wherein the information included in the first shareable version of the dating profile of the user and the second shareable version of the dating profile of the user is based on a location in which the first shareable version of the dating profile of the user and the second shareable version of the dating profile of the user are shared.

10. The computer-implemented method of claim 1, wherein the interface comprises an interface of a digital matchmaker center, provided within the dating application, configured for the user and one or more additional users designated by the user with a matchmaker designation.

11. The computer-implemented method of claim 1, further comprising:

identifying ages associated with a plurality of the dating matches of the user; and providing the ages within a matches-ages summary section of the digital dating-analytics dashboard.

12. The computer-implemented method of claim 11, wherein the matches-ages summary section comprises at least one of an age range, of all of the dating matches of the user, or, for each sub-range within a plurality of sub-ranges with the age range of all of the dating matches of the user, a percentage of the dating matches of the user whose age falls within the sub-range.

13. The computer-implemented method of claim 1, wherein the short-form video is further based on the common interests section of the digital dating-analytics dashboard.

14. A system comprising:

at least one physical processor; and physical memory comprising computer-executable instructions that, when executed by the physical processor, cause the physical processor to:

provide a selectable dashboard element within an interface of a dating application configured for a user of the dating application;

receive user input selecting the selectable dashboard element;

in response to receiving the user input, present a digital dating-analytics dashboard with a common interests section that provides, for a particular interest of the user, a percentage of the user's dating matches that share the particular interest, wherein the percentage corresponds to a number of additional users, who accepted the user as a dating match and whom were accepted by the user as a dating match, that share the particular interest relative to a number of additional users, who accepted the user as a dating match and whom were accepted by the user as a dating match, that do not share the particular interest;

generate a short-form video, configured for a social media consumption channel, based on dating analytics of the digital dating-analytics dashboard relating to a dating history of the user; and post the short-form video to the social media consumption channel.

15. The system of claim 14, wherein the computer-executable instructions further cause the physical processor to:

identify locations associated with a plurality of the dating matches of the user; and provide the locations within a matches-locations summary section of the digital dating-analytics dashboard.

16. The system of claim 15, wherein the matches-locations summary section comprises at least one of:

one or more top locations associated with the dating matches of the user; or for each location within a plurality of locations, a percentage of the dating matches of the user associated with the location.

17. The system of claim 14, wherein the computer-executable instructions further cause the physical processor to:

identify a user dating-engagement metric corresponding to the user; and provide the user dating-engagement metric within the digital dating-analytics dashboard.

18. The system of claim 17, wherein the user dating-engagement metric comprises at least one of:

a number of messages sent by the user via the dating application;

a number of dating matches reviewed by the user via the dating application;

a number of dating matches accepted by the user via the dating application; or a number of dating matches rejected by the user via the dating application.

19. The system of claim 14, wherein the computer-executable instructions further cause the physical processor to provide self-help content within the digital dating-analytics dashboard.

20. A non-transitory computer-readable medium comprising one or more computer-readable instructions that, when executed by at least one processor of a computing device, cause the computing device to:

provide a selectable dashboard element within an interface of a dating application configured for a user of the dating application;

receive user input selecting the selectable dashboard element;

in response to receiving the user input, present a digital dating-analytics dashboard with a common interests section that provides, for a particular interest of the user, a percentage of the dating matches that share the particular interest, wherein the percentage corresponds to a number of additional users, who accepted the user as a dating match and whom were accepted by the user as a dating match, that share the particular interest relative to a number of additional users, who accepted the user as a dating match and whom were accepted by the user as a dating match, that do not share the particular interest;

generate a short-form video, configured for a social media consumption channel, based on dating analytics of the digital dating-analytics dashboard relating to a dating history of the user; and post the short-form video to the social media consumption channel.

\* \* \* \* \*